UNITED STATES PATENT OFFICE.

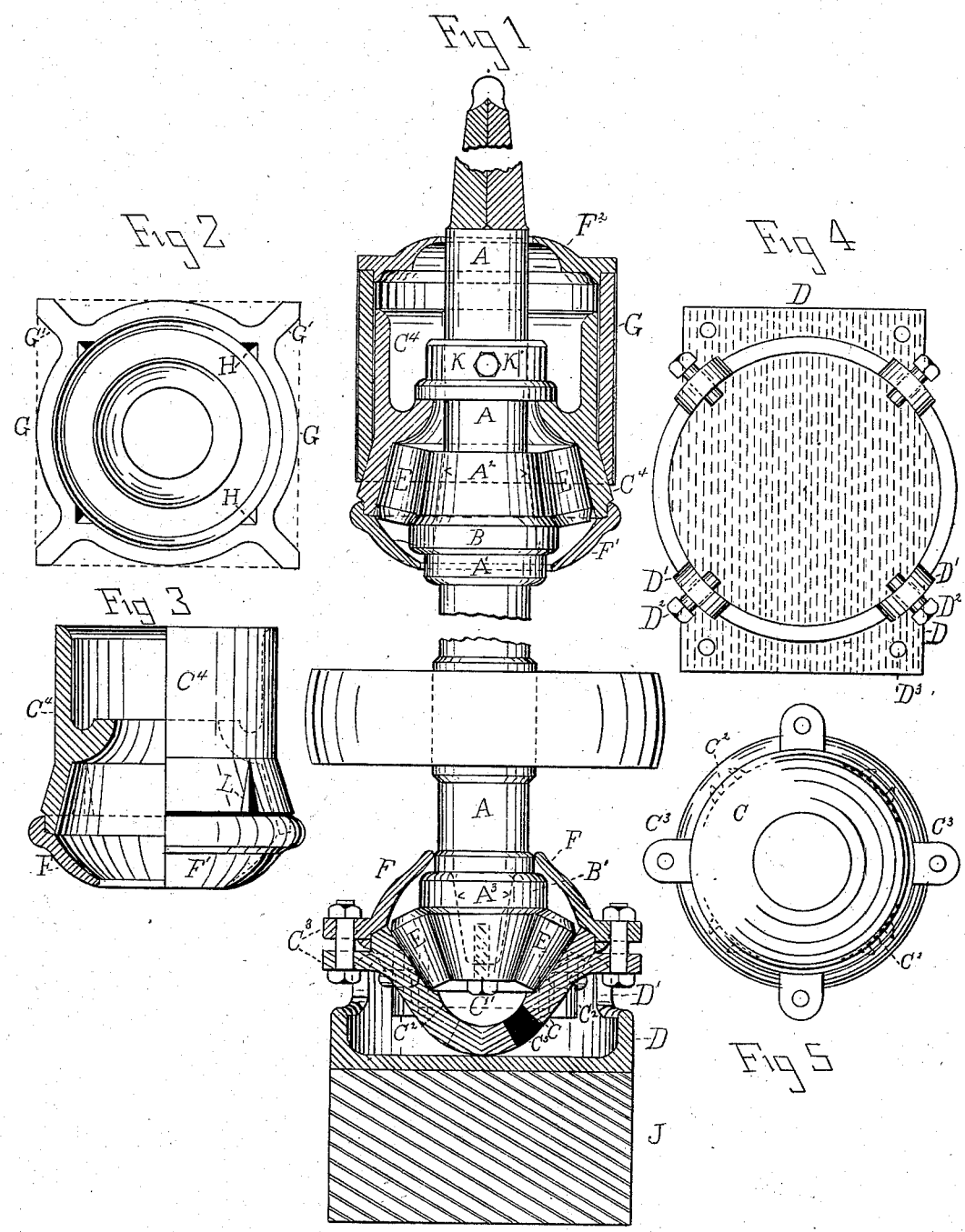

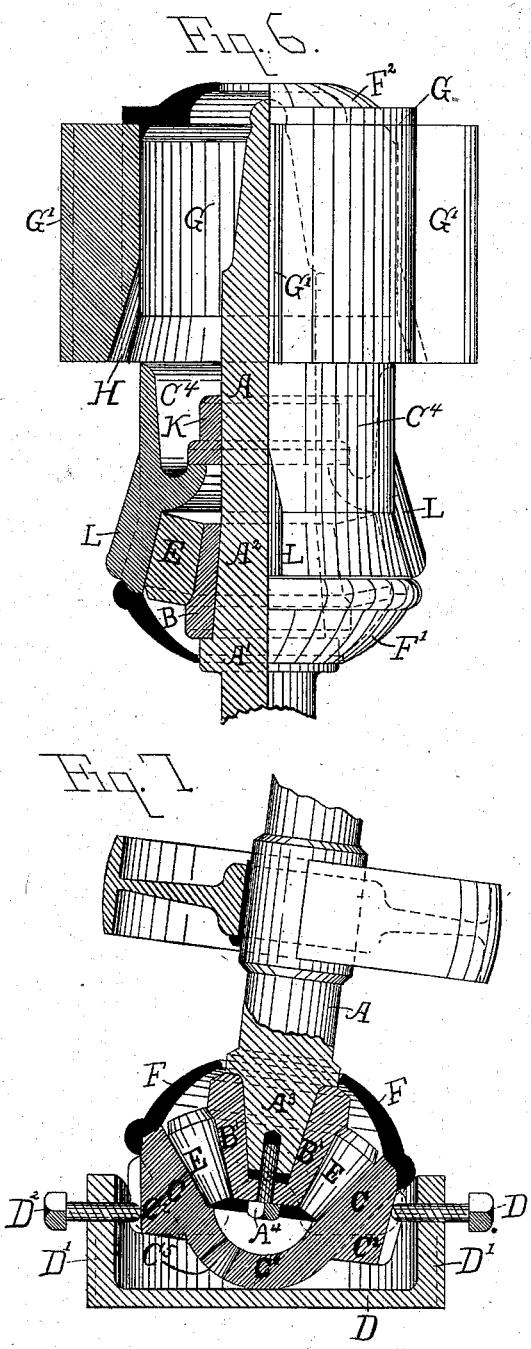

THOMAS F. HEMMICH, OF READING, PENNSYLVANIA, ASSIGNOR OF ONE-HALF TO JOHN G. KALBACH, OF SAME PLACE.

STEP AND BUSH FOR SPINDLES, &c.

SPECIFICATION forming part of Letters Patent No. 254,972, dated March 14, 1882.

Application filed November 16, 1881. (No model.)

*To all whom it may concern:*

Be it known that I, THOMAS F. HEMMICH, of the city of Reading, county of Berks, State of Pennsylvania, have invented a new and useful Improvement in Steps and Bushes for Spindles, &c., of which the following is a specification.

This invention relates more particularly to that class of upright shafts or spindles wherein it is considered desirable to give a nice adjustment to the step, and to prevent to a great extent friction and the heating consequent thereon.

Referring to the drawings herewith, forming part of this specification, in which similar parts are in the several figures marked with corresponding letters, Figure 1, Sheet 1, represents an elevation of a mill-spindle, showing the step and the mill-spindle bush in section. Fig. 2, Sheet 1, represents a plan of the exterior bush, showing wings by which to adjust in the eye of the bed-stone and guide-entrances for the interior mill bush. Fig. 3, Sheet 1, is an elevation, partly in section, of the interior mill-bush, showing feathers L to lock with grooves H of exterior bush. Fig. 4, Sheet 1, is a plan of the bridge-tree plate. Fig. 5, Sheet 1, is a top plan of the spherical base-step case. Fig. 6, Sheet 2, represents the spindle dropped so as to bring the interior bush below the engaging-point of the exterior bush. Fig. 7, Sheet 2, represents a spindle thrown out of perpendicular by the sinking of the husk, or from any other cause, and still retaining a direct bearing upon the step from the action of the spherical base of the shell-seat.

A represents the spindle provided with the usual cock-head, and the enlargement for the reception of the pulley or gear by which it is driven, and in addition thereto, to adapt it to my improvements, it has a tapered swell, $A^2$, and collar $A'$, in place of the usual bush-swell, and at the lower end it has a reduced portion, $A^3$, by which it is adapted to receive the chilled collar B at the bush, and the chilled toe $B'$ at the step.

C is the foot-step, shell, or case, having an internal anti-friction roller-seat.

$C'$ is a hemispherical base to the shell, upon which it rests within the wall of and upon the floor of the bridge-tree plate D.

$C^2 C^2$ are abutments upon the exterior of the shell to receive the thrust of the bridge-tree-plate adjusting-screws.

$C^3$ are ears upon both cap and shell, whereby the two are secured together by bolts through the same. $C^5$ are dirt-discharging holes in the spherical base of the shell.

$C^4$ represents the interior mill-bush, which is provided with an internal anti-friction-roller seat, and has a drum or circular form expanded at its lower edge to form the seat for the rollers, and has on its exterior surface guide-feathers L, which engage with the recess H in the exterior box or bush when the two bushes are in full contact.

D represents the bridge-tree plate, the base being of oblong form and having a circular wall or rim raised thereon, said rim having ears $D'$ tapped for adjusting-screws $D^2$, the plate being secured to the bridge-tree J by bolts through the bolt-holes $D^3$. The bridge tree J is pivoted at one end and hung in a yoke of a screwed rod at the opposite end, whereby the spindle and upper millstone may be lifted or lowered by manipulating a hand-wheel near the stone case or curb. No part of this device is shown in the drawings, it being well known and in common use.

E represents chilled anti-friction rollers placed at the step between the shell C and the toe $B'$, and in the bush between the shell $C^4$ and the collar B.

F represents the cap of the step, shell, or case; $F'$, the cap of the interior mill-bush, and $F^2$ the cap of the exterior mill-bush. G is the exterior mill-bush, having four or more projecting wings, $G'$, a cap, $F^2$, at the top, and is coned below to receive the cone of the interior bush, the recessed cone having guide-grooves H, in which the feathers L of the interior bush interlock.

The object in providing a drum with wings, in lieu of the usual square bush, is to save time in fitting the same to the bed-stone.

K is a loose collar of metal dropped over the body of the spindle after the interior bush has been put in place, and is in contact with the same, closing the opening through the bush. It is secured in place by a set-screw, K', and serves to bring down the bush C⁴ with the spindle when the bridge-tree is lowered.

The collar B at the bush, and toe B' at the step, are both cast upon a mandrel within a chill of the proper form, so that all cast therein shall be duplicates of each other, and the interior roller-seats of both the shell-case C and the bush C⁴ may be cast upon chills, so as to have a case-hardened or chilled surface for wear. The anti-friction rollers in my improvement are invariably cast in chills or made of steel or phosphor bronze.

From sinking of foundations and shrinkage of timber mill-work is constantly undergoing a change of alignment, and therefore it is important, particularly with mill-spindles, to have the means of ready adjustment to prevent bad work and excessive friction. This my improvement aims to give. The base of my step-shell being spherical, it may be shifted within the limits of the bridge-tree plate wall without making any change in the position of the anti-friction rollers upon the seat of the shell or of the toe B' upon the rollers. The shell C, as it is moved by the screws D, slides radial to the spindle in an arc, leaving but a point on the shell in contact with the bridge-tree plate. The adjustment of the shell by the screws D² does not, although pressed from one wall-ear to the opposite, create any looseness of the parts, the step-shell abutments being tapered vertically. As the shell rolls from one position into the other, the surfaces of the abutments between the screws balance each other, the steepness of the plane increasing on one abutment as it decreases upon the other, and vice versa.

To adapt spindles now in use to my improvement they are removed to the machine-shop and the bush, collar, or swell turned down to the standard form A² shown in Fig. 4, Sheet 1, and the lower end reduced, as shown at A³, Fig. 5, Sheet 1, whereby it will be adapted to receive the chilled collar B and the toe B'. The collar K will be bored to slip easily over the spindle, and is secured to the same by the set-screw K'. The toe B' is secured to the spindle by the set-bolt A⁴, which is tapped therein. These are all the changes necessary to secure the benefit of the improvements above described.

Having described my improvements, I desire to secure by Letters Patent the following claims:

1. In combination with a shaft or spindle, A, provided with an anti-friction toe-collar, B', anti-friction rollers E, the case or shell C, provided with a hemispherical base, C', and abutments C², cap F, and internal bed adapted to receive the anti-friction rollers E, the bridge-tree plate ring, and the screws D², substantially as shown, and for the purpose set forth.

2. The bridge-tree plate D, having a circular rim, and ears D', and set-screws D², in combination with a spherical shell-step, C, having abutments C², rollers E, and toe B', of a spindle or shaft, A, substantially as shown, and for the purpose described.

3. The exterior mill-bush shell, G, constructed as described, having wings G', cap F², and guide entrances or grooves H, in combination with the interior mill-bush, C⁴, having feathers L, rollers E, collar B, and spindle A, substantially as and for the purpose hereinbefore set forth.

4. The interior mill-bush, C⁴, provided with feathers L, and an internal conoidal bed, the anti-friction rollers E and cap F', in combination with the collar B, collar K, spindle A, and outer bush, G, having guide-entrances H, substantially as shown, and for the purpose described.

THOMAS F. HEMMICH.

Witnesses:
JAMES R. KENNEY,
R. J. JACOBS.